(12) United States Patent
Makabe et al.

(10) Patent No.: US 9,266,063 B2
(45) Date of Patent: Feb. 23, 2016

(54) HOLDING MATERIAL FOR GAS TREATMENT DEVICE, GAS TREATMENT DEVICE, AND METHOD RELATING TO SAME

(71) Applicant: NICHIAS CORPORATION, Tokyo (JP)

(72) Inventors: Hiroshi Makabe, Tokyo (JP); Hiroki Nakamura, Tokyo (JP); Junya Satoh, Tokyo (JP); Isami Abe, Tokyo (JP); Akihiro Nakashima, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/391,233

(22) PCT Filed: Mar. 13, 2013

(86) PCT No.: PCT/JP2013/057070
§ 371 (c)(1),
(2) Date: Oct. 8, 2014

(87) PCT Pub. No.: WO2013/153900
PCT Pub. Date: Oct. 17, 2013

(65) Prior Publication Data
US 2015/0151249 A1  Jun. 4, 2015

(30) Foreign Application Priority Data

Apr. 13, 2012  (JP) .................................. 2012-091710

(51) Int. Cl.
*B01D 53/88* (2006.01)
*B01D 53/94* (2006.01)
*F01N 3/28* (2006.01)

(52) U.S. Cl.
CPC .............. *B01D 53/94* (2013.01); *B01D 53/885* (2013.01); *F01N 3/2871* (2013.01)

(58) Field of Classification Search
CPC ..... F01N 3/2871; F01N 3/2839; B01D 53/94; B01D 53/885; B01D 53/88

USPC ............................................. 29/890; 422/311
See application file for complete search history.

(56) References Cited

U.S. PATENT DOCUMENTS 5,089,072 A  *  2/1992  Carson ................... B01D 53/86
                                                          156/187
5,674,461 A  *  10/1997  Kato ..................... F01N 3/2807
                                                          137/625.32

(Continued)

FOREIGN PATENT DOCUMENTS

DE       19638542 A1  *  3/1997  ............... B01J 35/06
EP       0299626 A2   *  1/1989  ............. B01D 53/86

(Continued)

OTHER PUBLICATIONS

International Search Report issued in International Application No. PCT/JP2013/057070 mailed May 21, 2013.

(Continued)

*Primary Examiner* — Timothy Vanoy
(74) *Attorney, Agent, or Firm* — Oliff PLC

(57) ABSTRACT

A holding material for gas treatment device, gas treatment device, and methods for those achieve proper control of a frictional resistance between the holding material and a casing. A method of treating a gas with a gas treatment device including a treatment structure, a casing made of a metal for housing the treatment structure and a holding material made of inorganic fibers placed between the treatment structure and the casing, the method including: placing an organic polymer between the holding material and the casing so that the organic polymer is brought into contact with an outer surface of the holding material and an inner surface of the casing during treatment of the gas; and treating the gas under a condition that a temperature of the casing is equal to or higher than a softening temperature of the organic polymer and lower than a decomposition temperature of the organic polymer.

10 Claims, 7 Drawing Sheets

(56) References Cited

U.S. PATENT DOCUMENTS

| | | | |
|---|---|---|---|
| 7,696,124 B2* | 4/2010 | Felix | B01D 53/86 |
| | | | 502/107 |
| 2007/0084171 A1 | 4/2007 | Kaneko | |
| 2007/0193028 A1* | 8/2007 | Brandt | F01N 3/2839 |
| | | | 29/890 |
| 2009/0041967 A1 | 2/2009 | Tomosue et al. | |
| 2009/0049690 A1* | 2/2009 | Eguchi | B01D 53/9454 |
| | | | 29/890 |
| 2010/0107582 A1 | 5/2010 | Sugino et al. | |
| 2011/0158863 A1 | 6/2011 | Tomosue et al. | |

FOREIGN PATENT DOCUMENTS

| | | |
|---|---|---|
| EP | 2 172 625 A1 | 4/2010 |
| JP | 2000-240439 A | 9/2000 |
| JP | A-2001-521847 | 11/2001 |
| JP | A-2007-504385 | 3/2007 |
| JP | A-2008-291801 | 12/2008 |
| JP | A-2009-41499 | 2/2009 |
| JP | A-2010-112267 | 5/2010 |
| JP | A-2010-174645 | 8/2010 |
| JP | 2010-284571 A | 12/2010 |
| JP | 2011-137418 A | 7/2011 |
| JP | A-2011-231774 | 11/2011 |
| WO | WO 99/23370 A1 | 5/1999 |
| WO | 2010/105000 A1 | 9/2010 |
| WO | WO 2011115237 A1 * | 9/2011 ............. A61L 9/205 |

OTHER PUBLICATIONS

Nov. 6, 2015 Search Report issued in European Patent Application No. 13776051.8.

* cited by examiner

FIG.9

| | | EXAMPLE1-1 | COMPARATIVE EXAMPLE1-1 | COMPARATIVE EXAMPLE1-2 | COMPARATIVE EXAMPLE1-3 | EXAMPLE1-2 | COMPARATIVE EXAMPLE1-4 | COMPARATIVE EXAMPLE1-5 | COMPARATIVE EXAMPLE1-6 |
|---|---|---|---|---|---|---|---|---|---|
| ORGANIC POLYMER | KIND | PE | — | PE | — | PE | — | PE | — |
| | SOFTENING TEMPERATURE(°C) | 90 | | 90 | | 90 | | 90 | |
| | DECOMPOSITION TEMPERATURE(°C) | 400 | | 400 | | 400 | | 400 | |
| MEASUREMENT CONDITION | COOLING OPERATION | PRESENT | PRESENT | ABSENT | ABSENT | PRESENT | PRESENT | ABSENT | ABSENT |
| | GAP(mm) | 4 | 4 | 4 | 4 | 5 | 5 | 5 | 5 |
| | TREATMENT STRUCTURE TEMPERATURE(°C) | 800 | 800 | 800 | 800 | 900 | 900 | 900 | 900 |
| MEASUREMENT RESULT | CASING TEMPERATURE(°C) | 346 | 346 | 503 | 503 | 357 | 357 | 538 | 538 |
| | EXTRUSION LOAD(N) | 1440 | 909 | 1160 | 1099 | 1668 | 1127 | 1181 | 1311 |

FIG.10

| | | EXAMPLE 2-1 | COMPARATIVE EXAMPLE 2-1 | EXAMPLE 2-2 | COMPARATIVE EXAMPLE 2-2 | EXAMPLE 2-3 | COMPARATIVE EXAMPLE 2-3 | EXAMPLE 2-4 | COMPARATIVE EXAMPLE 2-4 | EXAMPLE 2-5 | COMPARATIVE EXAMPLE 2-5 | EXAMPLE 2-6 | COMPARATIVE EXAMPLE 2-6 |
|---|---|---|---|---|---|---|---|---|---|---|---|---|---|
| ORGANIC POLYMER | KIND | PVC | — | PET | — | PVAc | — | PP | — | PI | — | PI | — |
| | SOFTENING TEMPERATURE(°C) | 70 | | 250 | | 60 | | 170 | | 210 | | 210 | |
| | DECOMPOSITION TEMPERATURE(°C) | 250 | | 300 | | 300 | | 400 | | 500 | | 500 | |
| MEASUREMENT CONDITION | COOLING OPERATION | PRESENT | PRESENT | PRESENT | PRESENT | PRESENT | PRESENT | PRESENT | PRESENT | PRESENT | PRESENT | ABSENT | ABSENT |
| | GAP(mm) | 5 | 5 | 4 | 4 | 6 | 6 | 5 | 5 | 4 | 4 | 4 | 4 |
| | TREATMENT STRUCTURE TEMPERATURE(°C) | 600 | 600 | 700 | 700 | 750 | 750 | 800 | 800 | 900 | 900 | 700 | 700 |
| MEASUREMENT RESULT | CASING TEMPERATURE (°C) | 199 | 199 | 284 | 284 | 235 | 235 | 325 | 325 | 417 | 417 | 417 | 417 |
| | EXTRUSION LOAD(N) | 1152 | 619 | 1203 | 975 | 1346 | 1155 | 1681 | 1118 | 1624 | 1153 | 1551 | 1290 |

FIG.11

|  |  | EXAMPLE3-1 | EXAMPLE3-2 | EXAMPLE3-3 | EXAMPLE3-4 | COMPARATIVE EXAMPLE 3 |
|---|---|---|---|---|---|---|
| PET NONWOVEN FABRIC |  | PRESENT | PRESENT | PRESENT | ABSENT | ABSENT |
| ORGANIC POLYMER | KIND | PE | PE | — | PE | — |
|  | SOFTENING TEMPERATURE(°C) | 90 | 90 |  | 90 |  |
|  | DECOMPOSITION TEMPERATURE(°C) | 400 | 400 |  | 400 |  |
| METHOD OF PRODUCING HOLDING MATERIAL | | WET | DRY | DRY | DRY | DRY |
|  | COOLING OPERATION | PRESENT | PRESENT | PRESENT | PRESENT | PRESENT |
| MEASUREMENT CONDITION | GAP(mm) | 4 | 4 | 4 | 4 | 4 |
|  | TREATMENT STRUCTURE TEMPERATURE(°C) | 700 | 700 | 700 | 700 | 700 |
|  | CASING TEMPERATURE(°C) | 284 | 284 | 284 | 284 | 284 |
| MEASUREMENT RESULT | EXTRUSION LOAD(N) | 1541 | 1539 | 1199 | 1253 | 972 |

HOLDING MATERIAL FOR GAS TREATMENT DEVICE, GAS TREATMENT DEVICE, AND METHOD RELATING TO SAME

TECHNICAL FIELD

The present invention relates to a holding material for a gas treatment device, a gas treatment device, and methods for those, and more particularly, to control of a frictional resistance between a holding material and a casing.

BACKGROUND ART

A vehicle such as an automobile is provided with a gas treatment device such as a catalyst converter for removing a harmful substance such as carbon monoxide, a hydrocarbon, or a nitrogen oxide in the exhaust gas of a gasoline engine, or a diesel particulate filter (DPF) for removing a particle in the exhaust gas of a diesel engine. Available as the catalyst converter is, for example, a catalyst converter provided with a tubular catalyst carrier, a tubular casing made of a metal for housing the catalyst carrier, and a mat-shaped holding material made of inorganic fibers placed between the catalyst carrier and the casing. One of the functions required for the holding material is to prevent the detachment of the catalyst carrier from the casing.

In view of the foregoing, in Patent Literature 1 for example, it has heretofore been proposed that inorganic particles are adhered and fixed to the outer surfaces of ceramic fibers constituting the holding material to form an irregular structure, thereby increasing the frictional resistance of each of the ceramic fibers.

CITATION LIST

Patent Literature

Patent Literature 1: JP 2011-231774 A

SUMMARY OF INVENTION

Technical Problem

However, the related art has involved, for example, the following problems. A heating calcination operation is needed for adhering and fixing the inorganic particles to the outer surfaces of the ceramic fibers. The inorganic particles also increase a frictional resistance upon insertion of the holding material into the casing (at the time of canning). The inorganic particles may be detached by vibration or the like during the use of the catalyst converter. A frictional resistance between the holding material and the casing may be reduced by the detached inorganic particles instead. In addition, the inorganic particles are embedded in the holding material and hence the effect is not obtained in some cases.

The present invention has been made in view of the problems, and one of the objects of the present invention is to provide a holding material for a gas treatment device, a gas treatment device, and methods for those, which achieve proper control of a frictional resistance between the holding material and a casing.

Solution to Problem

A gas treatment method according to one embodiment of the present invention for achieving the above-mentioned object is a method of treating a gas with a gas treatment device including a treatment structure, a casing made of a metal for housing the treatment structure and a holding material made of inorganic fibers placed between the treatment structure and the casing, the method including: placing an organic polymer between the holding material and the casing so that the organic polymer is brought into contact with an outer surface of the holding material and an inner surface of the casing during treatment of the gas; and treating the gas under a condition that a temperature of the casing is equal to or higher than a softening temperature of the organic polymer and lower than a decomposition temperature of the organic polymer. According to the present invention, the gas treatment method that achieves proper control of the fractional resistance between the holding material and the casing is provided.

In addition, in the gas treatment method, the temperature of the casing during the treatment of the gas may be 60° C. or more and 500° C. or less. In addition, in the gas treatment method, the treatment of the gas may be performed under a condition that the temperature of the casing is regulated to be equal to or higher than the softening temperature of the organic polymer and lower than the decomposition temperature of the organic polymer by cooling the casing.

A holding material for a gas treatment device according to one embodiment of the present invention for achieving the above-mentioned object is a holding material made of inorganic fibers for a gas treatment device to be placed between a treatment structure and a casing in the gas treatment device comprising the treatment structure and the casing made of a metal for housing the treatment structure, in which an organic polymer, which has a softening temperature equal to or lower than a temperature of the casing during treatment of a gas with the gas treatment device and a decomposition temperature higher than the temperature of the casing during the treatment of the gas, is placed on an outer surface of the holding material so that the organic polymer is brought into contact with an inner surface of the casing during the treatment of the gas. According to the present invention, the holding material for a gas treatment device that achieves proper control of the frictional resistance between itself and the casing in the gas treatment device is provided.

A gas treatment device according to one embodiment of the present invention for achieving the above-mentioned object is a gas treatment device including: a treatment structure; a casing made of a metal for housing the treatment structure; and a holding material made of inorganic fibers placed between the treatment structure and the casing, in which an organic polymer, which has a softening temperature equal to or lower than a temperature of the casing during treating of a gas with the gas treatment device and a decomposition temperature higher than the temperature of the casing during the treatment of the gas, is placed between the holding material and the casing so that the organic polymer is brought into contact with an outer surface of the holding material and an inner surface of the casing during the treatment of the gas. According to the present invention, the gas treatment device that achieves proper control of the frictional resistance between the holding material and the casing is provided.

A method of producing a holding material for a gas treatment device according to one embodiment of the present invention for achieving the above-mentioned object is a method of producing a holding material made of inorganic fibers for a gas treatment device to be placed between a treatment structure and a casing in the gas treatment device comprising the treatment structure and the casing made of a metal for housing the treatment structure, the method including placing an organic polymer, which has a softening temperature equal to or lower than a temperature of the casing during treatment of a gas with the gas treatment device and a decomposition temperature higher than the temperature of the casing during the treatment of the gas, on an outer surface of the holding material so that the organic polymer is brought into contact with an inner surface of the casing during the treatment of the gas. According to the present invention, the method of producing a holding material for a gas treatment device that achieves proper control of the frictional resistance between itself and the casing in the gas treatment device is provided.

In addition, the method of producing a holding material may further include: determining the temperature of the casing during the treatment of the gas; selecting the organic polymer having a softening temperature equal to or lower than the determined temperature of the casing and a decomposition temperature higher than the determined temperature of the casing; and placing the selected organic polymer on the outer surface of the holding material so that the organic polymer is brought into contact with the inner surface of the casing during the treatment of the gas.

A method of producing a gas treatment device according to one embodiment of the present invention for achieving the above-mentioned object is a method of producing a gas treatment device including a treatment structure, a casing made of a metal for housing the treatment structure and a holding material made of inorganic fibers placed between the treatment structure and the casing, the method including placing an organic polymer, which has a softening temperature equal to or lower than a temperature of the casing during treatment of a gas with the gas treatment device and a decomposition temperature higher than the temperature of the casing during the treatment of the gas, between the holding material and the casing so that the organic polymer is brought into contact with an outer surface of the holding material and an inner surface of the casing during the treatment of the gas. According to the present invention, the method of producing a gas treatment device that achieves proper control of the frictional resistance between the holding material and the casing can be provided.

In addition, the method of producing a gas treatment device may further include: determining the temperature of the casing during the treatment of the gas; selecting the organic polymer having a softening temperature equal to or lower than the determined temperature of the casing and a decomposition temperature higher than the determined temperature of the casing; and placing the selected organic polymer between the holding material and the casing so that the organic polymer is brought into contact with the outer surface of the holding material and the inner surface of the casing during the treatment of the gas.

Advantageous Effects of Invention

According to the present invention, the holding material for a gas treatment device, the gas treatment device, and the methods for those, which achieve proper control of the frictional resistance between the holding material and the casing, are provided.

BRIEF DESCRIPTION OF DRAWINGS

FIG. 9 is an explanatory diagram showing an example of the result of the measurement of the extrusion load of a treatment structure from a casing in each of the examples according to the embodiment of the present invention.

FIG. 10 is an explanatory diagram showing another example of the result of the measurement of the extrusion load of the treatment structure from the casing in each of the examples according to the embodiment of the present invention.

FIG. 11 is an explanatory diagram showing still another example of the result of the measurement of the extrusion load of the treatment structure from the casing in each of the examples according to the embodiment of the present invention.

DESCRIPTION OF EMBODIMENTS

Embodiments of the present invention are hereinafter described. It should be noted that the present invention is not limited to these embodiments.

Figure 1:
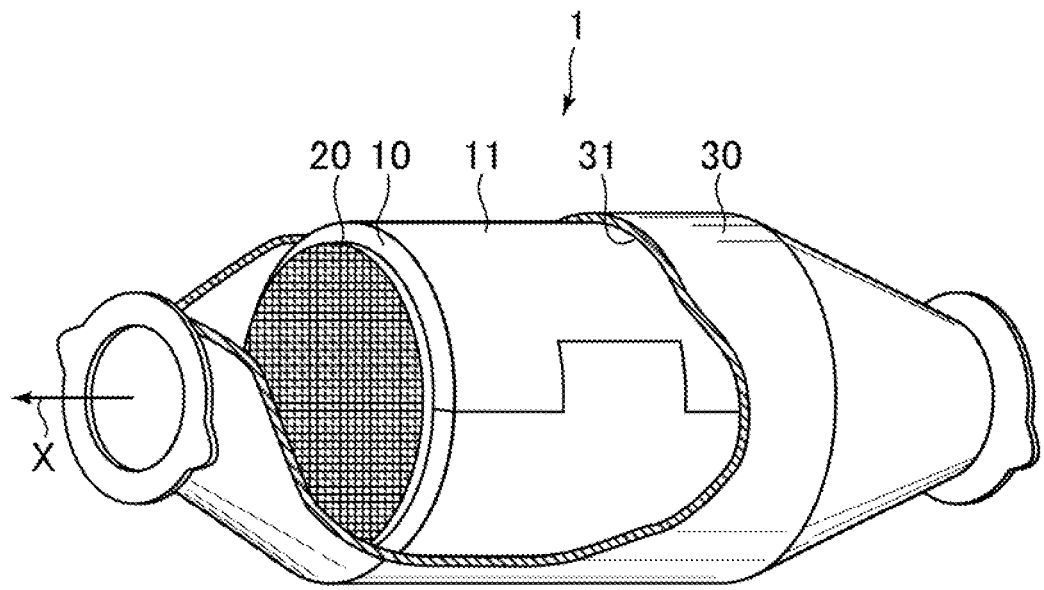
FIG. 1 is an explanatory diagram illustrating an example of a gas treatment device according to an embodiment of the present invention.

First, the outline of an embodiment of the present invention is described. FIG. 1 is an explanatory diagram illustrating an example of a gas treatment device 1 according to this embodiment. As illustrated in FIG. 1, the gas treatment device 1 includes a treatment structure 20, a casing 30 made of a metal for housing the treatment structure 20, and a holding material 10 made of inorganic fibers placed between the treatment structure 20 and the casing 30. It should be noted that in FIG. 1, for convenience of description, a part of the casing 30 is omitted, and the treatment structure 20 and holding material 10 housed in the casing 30 are exposed and illustrated.

Figure 2:
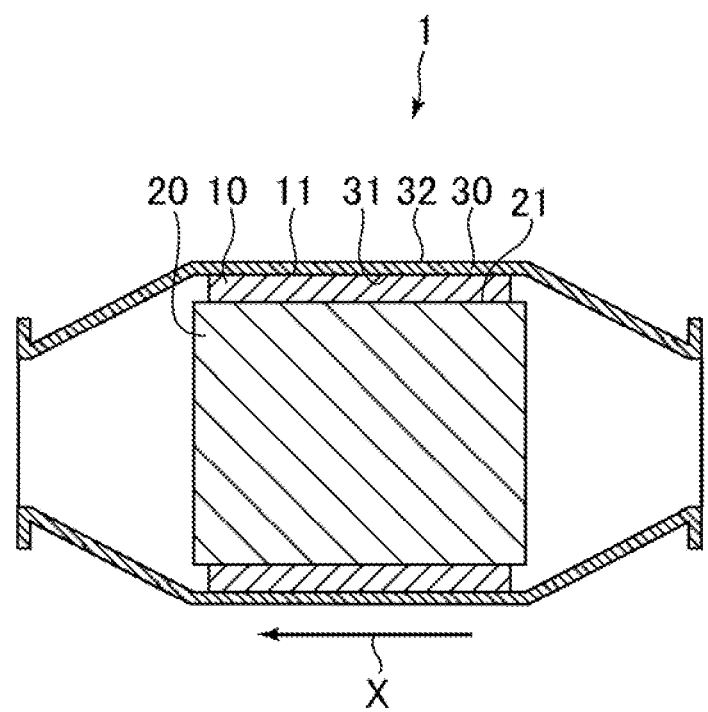
FIG. 2 is an explanatory diagram illustrating an example of a cross-section obtained by cutting the gas treatment device according to the embodiment of the present invention in its longitudinal direction.
Figure 3:
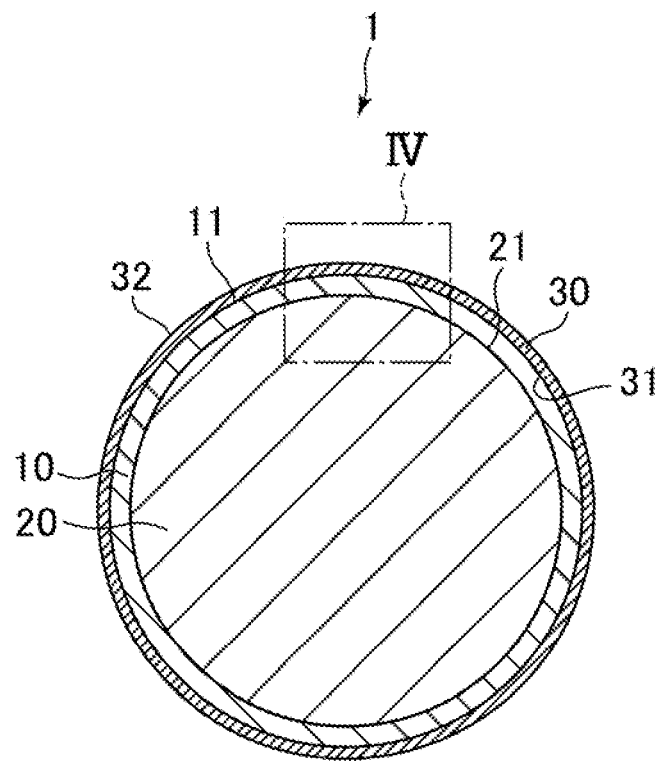
FIG. 3 is an explanatory diagram illustrating an example of a cross-section obtained by cutting the gas treatment device according to the embodiment of the present invention in a direction perpendicular to the longitudinal direction.
Figure 4:
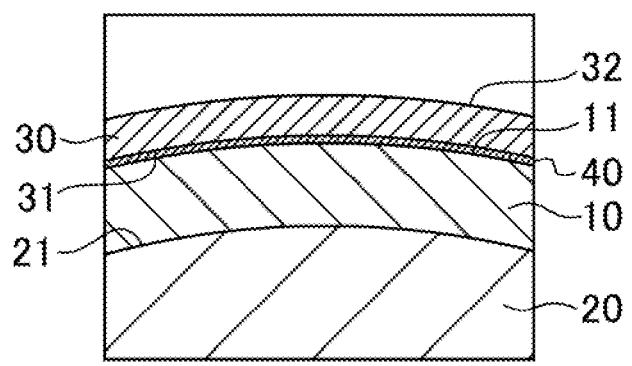
FIG. 4 is an enlarged explanatory diagram illustrating a part of the gas treatment device surrounded by a dash-dotted line IV illustrated in FIG. 3.
Figure 5:
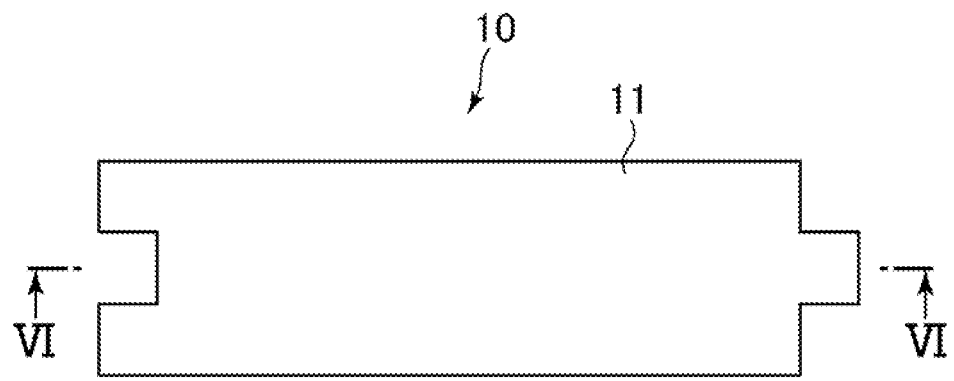
FIG. 5 is an explanatory diagram illustrating an example of a holding material according to an embodiment of the present invention in a planar view.
Figure 6:
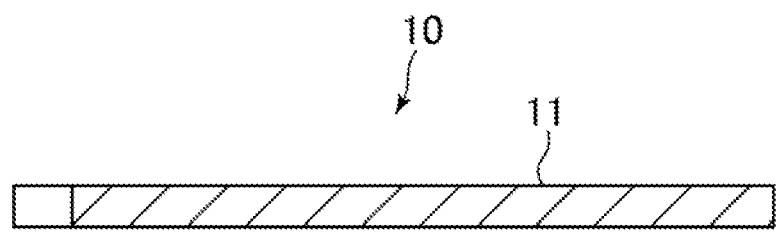
FIG. 6 is an explanatory diagram illustrating an example of a cross-section obtained by cutting the holding material along a VI-VI line illustrated in FIG. 5.
Figure 7:
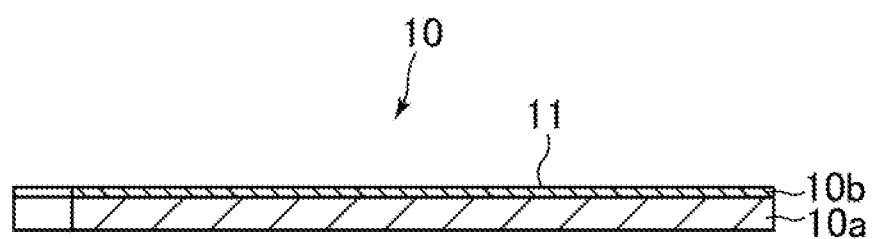
FIG. 7 is an explanatory diagram illustrating another example of the cross-section obtained by cutting the holding material along the VI-VI line illustrated in FIG. 5.

FIG. 2 is an explanatory diagram illustrating an example of a cross-section obtained by cutting the gas treatment device 1 in its longitudinal direction (a direction indicated by an arrow X illustrated in each of FIGS. 1 and 2). It should be noted that the arrow X in each of FIGS. 1 and 2 represents the direction in which a gas to be treated flows in the gas treatment device 1. FIG. 3 is an explanatory diagram illustrating an example of a cross-section obtained by cutting the gas treatment device 1 in a direction perpendicular to the longitudinal direction. FIG. 4 is an enlarged explanatory diagram illustrating a part of the gas treatment device 1 surrounded by a dash-dotted line IV illustrated in FIG. 3. FIG. 5 is an explanatory diagram illustrating an example of the holding material 10 for the gas treatment device according to this embodiment in a planar view. FIG. 6 is an explanatory diagram illustrating an example of a cross-section obtained by cutting the holding material 10 along a VI-VI line illustrated in FIG. 5. FIG. 7 is an explanatory diagram illustrating another example of the cross-section obtained by cutting the holding material 10 along the VI-VI line illustrated in FIG. 5.

The gas treatment device 1 is used for treating a gas, for example, for purifying a gas. That is, the gas treatment device 1 is used for, for example, removing harmful substances and/or particles contained in gas. Specifically, an example of the gas treatment device 1 is an exhaust gas treatment device for purifying an exhaust gas. In this case, the gas treatment device 1 is provided in, for example, a vehicle such as an automobile for removing harmful substances and/or particles contained in an exhaust gas discharged from an internal-combustion engine (gasoline engine, diesel engine, or the like).

That is, the gas treatment device 1 is, for example, a catalyst converter to be used for removing harmful substances contained in an exhaust gas in a vehicle such as an automobile. In addition, the gas treatment device 1 is, for example, a DPF to be used for removing particles contained in an exhaust gas discharged from a diesel engine.

The treatment structure 20 is a structure having a function of treating a gas. Specifically, in a case where the gas treatment device 1 is a catalyst converter, the treatment structure 20 is a catalyst carrier including a catalyst for purifying a gas and a carrier for supporting the catalyst. An example of the catalyst is a catalyst for removing harmful substances (carbon monoxide, hydrocarbons, nitrogen oxides, and the like) contained in a gas such as an exhaust gas. A more specific example of the catalyst is a metal catalyst such as a precious metal catalyst (for example, a platinum catalyst). An example of the carrier for supporting the catalyst is a tubular molded body (for example, a cylindrically-shaped honeycomb molded body) formed of an inorganic material (for example, ceramics such as cordierite).

Alternatively, in a case where the gas treatment device 1 is a device for removing particles contained in a gas, such as DPF, the treatment structure 20 is a structure including a porous material (for example, a filter) for trapping the particles in the gas. In this case, the treatment structure 20 may further include a catalyst, or may not include any catalyst.

The casing 30 is a tubular body made of a metal having a space formed in the inside thereof that houses the treatment structure 20. The metal constituting the casing 30 is not particularly limited, but for example, may be selected from the group consisting of stainless steel, iron, and aluminum.

For example, the casing 30 may be a tubular body separable into two sections along the longitudinal direction of the gas treatment device 1 (direction indicated by the arrow X illustrated in each of FIGS. 1 and 2), or may be an integrated tubular body that is not separable. In the examples illustrated in this embodiment, the casing 30 is an integrated tubular body.

The holding material 10 is used for holding the treatment structure 20 in the casing 30. Specifically, the holding material 10 is pressed into a gap between the casing 30 and the treatment structure 20 and thereby holds the treatment structure 20 in the casing 30 stably.

For example, the holding material 10 is required to have the following functions in combination: a function of securely holding the treatment structure 20 so as to prevent the treatment structure 20 from colliding with the casing 30 and breaking owing to vibration or the like in the gas treatment device 1; and a function of sealing the gap between the treatment structure 20 and the casing 30 so as to prevent an unpurified gas from leaking downstream through the gap. In addition, when a gas having a high temperature (of, for example, from 200 to 900° C.) such as an exhaust gas flows in the gas treatment device 1, the holding material 10 is required to have heat resistance and heat-insulating properties.

Accordingly, the holding material 10 is a molded body made of the inorganic fibers. That is, the holding material 10 contains the inorganic fibers as a main component. Specifically, the holding material 10 contains, for example, 90 mass % or more of the inorganic fibers.

Although the inorganic fibers constituting the holding material 10 are not particularly limited as long as the inorganic fibers do not deteriorate or hardly deteriorate during the use of the gas treatment device 1, the inorganic fibers may be, for example, one or more kinds selected from the group consisting of an alumina fiber, a mullite fiber, an aluminosilicate fiber, a silica fiber, a soluble inorganic fiber, a glass fiber, and rock wool.

The average fiber diameter of the inorganic fibers is preferably, for example, from 2 μm to 13 μm. The holding material 10 may contain a binder (an organic binder and/or an inorganic binder) in addition to the inorganic fibers, or may contain the binder and/or a filler.

The shape of the holding material 10 is not particularly limited as long as the treatment structure 20 can be held in the casing 30. Specifically, the holding material 10 may be, for example, a plate-shaped body (a film, a sheet, a blanket, a mat, or the like) or a tubular body.

It should be noted that one end and the other end of the plate-shaped holding material 10 may be formed into shapes corresponding to each other that can be fitted to each other. Specifically, in the example illustrated in FIG. 5, one end and the other end of the holding material 10 are formed into a convex shape and a concave shape corresponding to each other, respectively. Further, as illustrated, in FIG. 1, the one end and the other end of the holding material 10 arranged on an outer periphery of the treatment structure 20 are fitted to each other.

The bulb density of the holding material 10 is not particularly limited because the bulk density may be arbitrarily set so as to fail within a desired range in a state in which the holding material 10 is pressed into the gap between the treatment structure 20 and the casing 30. Specifically, the bulk density of the holding material 10 is arbitrarily set, for example, in accordance with the size of the gap between the treatment structure 20 and the casing 30. Specifically, the bulk density of the holding material 10 may be, for example, from 0.15 g/cm$^3$ to 0.7 g/cm$^3$.

A method of producing the molded body made of the inorganic fibers constituting the holding material 10 is not particularly limited, and each of a wet method and a dry method is employed. That is, the molded body is produced by, for example, dewatering molding. In this case, first, an aqueous slurry containing the inorganic fibers for constituting the holding material 10 and an organic binder (such as a rubber, a water-soluble organic polymer compound, a thermoplastic resin, or a thermosetting resin) is cast into a mold for dewatering molding having a predetermined shape. Then, the dewatering molding is performed. Thus, a molded body made of the inorganic fibers (wet molded body) having a shape corresponding to the shape of the mold is obtained. Further, the wet molded body is compressed so that its characteristics such as a bulk density and/or a basis weight fail within predetermined ranges, followed by drying. Thus, the molded body made of the inorganic fibers is finally obtained.

In addition, the molded body made of the inorganic fibers may be used as it is as the holding material 10. Alternatively, the holding material 10 may be produced by using the molded body made of the inorganic fibers produced as described above as a base member 10a and laminating a fiber sheet 10b on the base member 10a as illustrated in FIG. 7.

The fiber sheet 10b is a woven fabric or nonwoven fabric constituted of organic fibers and/or inorganic fibers, and is preferably a woven fabric or nonwoven fabric constituted of organic fibers. In a case where the organic fibers constituting the fiber sheet 10b are fibers of an organic polymer to be described later, the organic polymer may be placed as the fiber sheet 10b in the holding material 10 and/or the gas treatment device 1.

Although the thickness of the fiber sheet 10b is not particularly limited, for example, the thickness may be from 10 μm to 1 mm in the holding material 10 before its insertion into the casing 30, and/or may be from 1 μm to 100 μm after the insertion into the casing 30. When the holding material 10 has the fiber sheet 10b, the insertion (canning) of the holding material 10 and the treatment structure 20 into the casing 30 is smoothly performed.

In addition, the molded body made of the inorganic fibers constituting the holding material 10 may be produced by, for example, the dry method involving subjecting a collected inorganic fiber to needle processing. That is, in this case, the molded body made of the inorganic fibers is produced as, for example, the so-called blanket, needle mat, or sewn mat. In addition, the molded body made of the inorganic fibers may be used as it is as the holding material 10.

It should be noted that in the dry method, the use of an organic component such as the organic binder is not essential. Accordingly, the content of the organic component in the molded body made of the inorganic fibers produced by the dry method is smaller than that of a molded body produced by the wet method, and for example, the content may be from 0 wt % to 1.5 wt %, or may be from 0 wt % to 1.0 wt %. On the other hand, for example, the content of the organic component in the molded body made of the inorganic fibers produced by the wet method may be from 1.5 wt % to 20 wt %, may be from 1.5 wt % to 9 wt %, or may be from 1.5 wt % to 6 wt %.

The gas treatment device 1 is assembled by placing the treatment structure 20 and the holding material 10 in the casing 30. That is, for example, first, an assembly including the treatment structure 20 and the holding material 10 is produced by placing the holding material 10 on the outer periphery of the treatment structure 20. Specifically, in a case where the holding material 10 is of a plate shape, the assembly is produced by winding the holding material 10 around the outer periphery of the treatment structure 20. In addition, in a case where the holding material 10 is of a tubular shape, the assembly is produced by inserting the treatment structure 20 into the inner space of the holding material 10.

Next, the assembly is placed in the casing 30. That is, in a case where the casing 30 is of an integral type that is not separable, the assembly is pressed into the casing 30 from an opening portion at one end in the longitudinal direction of the casing 30 (the so-called stuffing system). On the other hand, in a case where the casing 30 is separable, the assembly is sandwiched between part of the separated casing 30 and the other part thereof, and then the casings 30 are integrated (the so-called clam shell system). The integration is performed by, for example, the use of clamping members such as a bolt and a nut, and/or welding.

In addition, in a gas treatment method according to this embodiment of the present invention, a gas is treated with such gas treatment device 1 as described above. That is, the gas to be treated is treated by making the gas flow in the treatment structure 20 of the gas treatment device 1.

More specifically, a gas such as an exhaust gas flows into the gas treatment device 1 illustrated in each of FIGS. 1 and 2 from one end of the casing 30 in the direction indicated by the arrow X and the gas is purified during its flow in the treatment structure 20, and the purified gas flows out of the gas treatment device 1 from the other end of the casing 30.

It should be noted that a piping for introducing a gas such as an exhaust gas from an upstream side to the gas treatment device 1 placed in a vehicle such as an automobile, and a piping for introducing a purified gas from the gas treatment device 1 to a downstream side are connected to one end of the gas treatment device 1 and the other end thereof, respectively.

Next, details about this embodiment are described. The gas treatment method according to this embodiment is a method of treating a gas with the gas treatment device 1 including the treatment structure 20, the casing 30, and the holding material 10, the method, including: placing an organic polymer 40 between the holding material 10 and the casing 30 so that the organic polymer 40 is brought into contact with an outer surface 11 of the holding material 10 and an inner surface 31 of the casing 30 during the treatment of the gas; and treating the gas under a condition that the temperature of the casing 30 is equal to or higher than the softening temperature of the organic polymer 40 and lower than the decomposition, temperature of the organic polymer 40.

That is, the inventors of the present invention have made extensive studies on technical means for properly controlling a frictional resistance between the holding material 10 and casing 30 in the gas treatment device 1. As a result, the inventors hare found in their own right that the frictional resistance between the holding material 10 and the casing 30 is effectively increased by the following procedure, and as a result, a holding force in the gas treatment device 1 is effectively increased: the organic polymer 40 is placed between the holding material 10 and the casing 30, and the temperature of the casing 30 is regulated to be equal to or higher than the softening temperature of the organic polymer 40 and lower than the decomposition temperature of the organic polymer 40 to soften the organic polymer 40 without decomposing the polymer, thereby bonding the polymer to the outer surface 11 of the holding material 10 and the inner surface 31 of the casing 30. Thus, the inventors have completed the present invention.

The organic polymer 40 is not particularly limited as long as the polymer softens by being heated to a temperature equal to or higher than its softening temperature and lower than its decomposition temperature, thereby bonding to the outer surface 11 of the holding material 10 and the inner surface of the casing 30. That is, for example, in a case where the temperature of the casing 30 during the treatment of the gas with the gas treatment device 1 is known, the organic polymer 40 having a softening temperature equal to or lower than the temperature of the casing 30 and a decomposition temperature higher than the temperature of the casing 30 is appropriately selected and used.

The softening temperature of the organic polymer 40 is not particularly limited as long as the softening temperature is equal to or lower than the temperature of the casing 30 during the treatment of the gas, and the softening temperature may be, for example, 100° C. or less. Although a lower limit for the softening temperature of the organic polymer 40 is not particularly limited, the softening temperature may be, for example, 60° C. or more. It should be noted that the softening temperature of the organic polymer 40 is, for example, a Vicat softening temperature measured by a method in conformity with JIS K7206.

The decomposition temperature of the organic polymer 40 is not particularly limited as long as the decomposition temperature is higher than the temperature of the casing 30 during the treatment of the gas, and for example, the decomposition temperature may be 200° C. or more, may be 250° C. or more, may be 300° C. or more, may be 350° C. or more, may be 400° C. or more, or may be 450° C. or more. Although an upper limit for the decomposition temperature of the organic polymer 40 is not particularly limited, for example, the decomposition temperature may be 600° C. or less, may be 500° C. or less, or may be 450° C. or less.

The upper limit and lower limit for the decomposition temperature of the organic polymer are arbitrarily combined. That is, for example, the decomposition temperature of the organic polymer 40 may be 200° C. or more and 600° C. or less, may be 100° C. or more and 500° C. or less, may be 200° C. or more and 450° C. or less, or may be 200° C. or more and 400° C. or less. In addition, for example, the decomposition temperature of the organic polymer 40 may be 400° C. or more and 600° C. or less, or may be 450° C. or more and 600° C. or less.

For example, the decomposition temperature of the organic polymer 40 may be higher than the temperature of the casing 30 during the treatment of the gas by 20° C. or more, may be higher than the temperature by 30° C. or more, or may be higher than the temperature 40° C. or more. In addition, the decomposition temperature of the organic polymer 40 may be higher than its softening temperature by 50® C. or more, may be higher than the softening temperature by 100° C. or more, or may be higher than the softening temperature by 150° C. or more. It should be noted that the decomposition temperature of the organic polymer 40 is determined as, for example, the temperature at which when the temperature at which a predetermined amount of the organic polymer 40 is heated is increased, a reduction in weight of the organic polymer 40 is initiated by its pyrolysis.

For example, a thermoplastic resin and/or a thermosetting resin may be used as the organic polymer 40. It seems that when the thermoplastic resin and/or the thermosetting resin are heated at a temperature equal to or higher than its softening temperature and lower than its decomposition temperature, the resin bonds to the holding material 10 and the casing 30 to increase the frictional resistance between the holding material 10 and the casing 30, and as a result, the holding force in the gas treatment device 1 is effectively increased.

The thermoplastic resin may be, for example, one kind or more selected from the group consisting of polyolefin-based resins (such as polyethylene and/or polypropylene), polyvinyl-based resins (such as one kind or more selected from the group consisting of polyvinyl chloride, polyvinyl acetate, polyvinylidene chloride, polyvinyl alcohol, polyvinyl acetal, and an acrylic resin), polyester-based resins (such as polyethylene terephthalate and/or polycarbonate), polyether-based resins (such as polyacetal), polyamide-based resins (such as one kind or more selected from the group consisting of nylon 6, nylon 66, nylon 12, and nylon 612) and fluorine-based resins (such as one kind or more selected from the group consisting of PTFE, ETFE, FEP, PFA, and PVDF). The thermosetting resin may be, for example, one kind or more selected from the group consisting of a polyimide resin, a phenol resin, a melamine resin, an epoxy resin, a polyurethane resin, and a urea resin.

The temperature of the casing 30 during the treatment of the gas is not particularly limited as long as the temperature is equal to or higher than the softening temperature of the organic polymer 40 and lower than the decomposition temperature of the organic polymer 40. That is, for example, the temperature of the casing 30 may be lower than the decomposition temperature of the organic polymer 40 by 20° C. or more, may be lower than the decomposition temperature by 30° C. or more, or may be lower than the decomposition temperature by 40° C. or more.

In addition, for example, the temperature of the casing 30 may be lower than the temperature of an outer surface 21 of the treatment structure 20 during the treatment of the gas by 200° C. or more, may be lower than the temperature by 250° C. or more, may be lower than the temperature by 300° C. or more, may be lower than the temperature by 350° C. or more, or may be lower than the temperature by 400° C. or more.

In addition, for example, the temperature of the casing 30 may be 60° C. or more and 500° C. or less. In addition, the temperature of the casing 30 may be a relatively low temperature. That is, for example, the temperature of the casing 30 may be 60° C. or more and 480° C. or less, may be 60° C. or more and 450° C. or less, may be 60° C. or more and 400° C. or less, may be 60° C. or more and 350° C. or less, or may be 60° C. or more and 300° C. or less.

In addition, the gas may be treated under the condition that the temperature of the casing 30 is regulated to be equal to or higher than the softening temperature of the organic polymer 40 and lower than the decomposition temperature of the organic polymer 40 by cooling the casing 30. That is, in this case, the gas is treated under the condition that the temperature of the casing 30 is regulated to fall within, for example, any one of the above-mentioned temperature ranges of from the softening temperature of the organic polymer 40 or more to a temperature less than the decomposition temperature of the organic polymer 40 by cooling the casing 30.

In a case where the casing 30 is cooled during the treatment of the gas, the temperature of the casing 30 is effectively reduced compared with that in a case where the cooling is not performed. That is, the temperature of the casing 30 is regulated to be lower than the temperature of the outer surface 21 of the treatment structure 20 by, for example, 400° C. or more by cooling the casing 30.

The cooling of the casing 30 may be performed by, for example, forming forced convection around an outer surface 32 of the casing 30. That is, the casing 30 is cooled by, for example, making a gas or liquid, which has a temperature lower than the temperature of the casing 30, flow around the outer surface 32 of the casing 30 so that heat exchange is performed between the casing 30 and the gas or the liquid.

Although a method of making the gas or the liquid flow is not particularly limited as long as the casing 30 is cooled, the gas or the liquid is made to flow by, for example, using a cooling device such as a fan or a pump, or utilizing wind produced in association with the traveling of a vehicle in which the gas treatment device 1 is installed. Specifically, for example, a case where the gas treatment device 1 is installed and used in an air-cooled and/or water-cooled internal combustion engine is conceivable as a case where the casing 30 is cooled with the cooling device.

In addition, a method of regulating the temperature of the casing 30 during the treatment of the gas so that the temperature is equal to or higher than the softening temperature of the organic polymer 40 and lower than the decomposition temperature of the organic polymer 40 is not limited to the above-mentioned example, and examples of the method include: a method involving increasing a distance (gap) from the outer surface 11 of the holding material 10 to the inner surface 31 of the casing 30; and a method involving forming the casing 30 into a shape that promotes the radiation of heat from the casing 30.

It should be noted that the temperature of the casing 30 during the treatment of the gas may be the temperature of the inner surface 31 of the casing 30, or may be the temperature of the outer surface 32 of the casing 30. The temperature of the inner surface 31 becomes close to the temperature of the outer surface 32 because the casing 30 is made of the metal. However, the temperature of the casing 30 is preferably specified by the temperature of the inner surface 31, which is brought into contact with the organic polymer 40. In addition, during the treatment of the gas, the temperature of the outer surface 11 of the holding material 10 is also preferably equal to or higher than the softening temperature of the organic polymer 40 and lower than the decomposition temperature of the organic polymer 40 as in the casing 30 described above.

During the treatment of the gas, the temperature of the outer surface 21 of the treatment structure 20 is higher than the temperature of the casing 30. This is because the temperature of a gas such as an exhaust gas flowing in the treatment structure 20 is higher than the temperature of the casing 30.

Although the temperature of the outer surface 21 of the treatment structure 20 during the treatment of the gas is not particularly limited, for example, the temperature may be equal to or higher than the decomposition temperature of the organic polymer 40. In this case, the temperature of the gas flowing in the treatment structure 20 (e.g., the temperature of the gas at the time of its flow into the treatment structure 20) is also equal to or higher than the decomposition temperature of the organic polymer 40.

For example, the temperature of the outer surface 21 of the treatment structure 20 may be higher than the decomposition temperature of the organic polymer 40 by 100° C. or more, may be higher than the decomposition temperature by 150° C. or more, or may be higher than the decomposition temperature by 200° C. or more. In such case, the temperature of the gas flowing in the treatment structure 20 is also higher than the decomposition temperature of the organic polymer 40 by 100° C. or more, 150° C. or more, or 200° C. or more.

In addition, for example, the temperature of the outer surface 21 of the treatment structure 20 may be 300° C. or more, may be 400° C. or more, may be 500° C. or more, may be 550° C. or more, may be 600° C. or more, may be 650° C. or more, or may be 700° C. or more. In such a case, the temperature of the gas flowing in the treatment structure 20 is also 300° C. or more, 400° C. or more, 500° C. or more, 550° C. or more, 600° C. or more, 650° C. or more, or 700° C. or more.

Here, when the casing 30 is cooled as described above, even in, for example, a case where the temperature of the outer surface 21 of the treatment structure 20 is relatively high (600° C. or more, 650° C. or more, or 700° C. or more), the temperature of the casing 30 is regulated to be lower than the temperature of the outer surface 21 of the treatment structure 20 by 400° C. or more. Although an upper limit for the temperature of the outer surface 21 of the treatment structure 20 during the treatment of the gas is not particularly limited, for example, the temperature may be 1,000° C. or less, or may be 900° C. or less.

In the gas treatment method according to this embodiment, when the temperature of the casing 30, the softening temperature of the organic polymer 40, and the decomposition temperature of the organic polymer 40 are caused to maintain such relationship as described above during the treatment of the gas, the frictional resistance between the holding material 10 and the casing 30 is effectively increased, and hence the fallout of the treatment structure 20 from the casing 30 is effectively prevented.

That is, in the gas treatment method, the temperature of the casing 30, which is brought into contact with the organic polymer 40 is equal to or higher than the softening temperature of the organic polymer 40 and lower than the decomposition temperature of the organic polymer 40. Accordingly, the softened organic polymer 40 effectively bonds to the outer surface 11 of the holding material 10 and the inner surface 31 of the casing 30 without decomposing, and hence the frictional resistance between the holding material 10 and the casing 30 is effectively increased.

Here, in the gas treatment device 1, the fallout of the treatment structure 20 from the casing 30 is more effectively prevented as a force obtained by combining a pressing force in a radial direction by the holding material 10 and the frictional resistance between the holding material 10 and the casing 30 enlarges.

In this respect, in the present invention, the frictional resistance between the holding material 10 and the casing 30 is effectively increased as described above, and hence even when the pressing force in the radial direction by the holding material 10 is reduced, the fallout of the treatment structure 20 from the casing 30 is sufficiently prevented.

The pressing force in the radial direction by the holding material 10 enlarges as the bulk density of the holding material 10 increases. Accordingly, in the present invention, for example, the bulk density of the holding material 10 is reduced compared with the conventional one. Therefore, the holding material 10 is reduced in weight, and the amount of a material constituting the holding material 10 (such as the inorganic fibers and/or the binder) is also be reduced.

The gas treatment device 1 according to this embodiment of the present invention is used in such gas treatment method. That is, the gas treatment device 1 includes the treatment structure 20, the casing 30, and the holding material 10, and the organic polymer 40, which has a softening temperature equal to or lower than the temperature of the casing 30 during the treatment of a gas with the gas treatment device 1 and a decomposition temperature higher than the temperature of the casing 30 during the treatment of the gas, is placed between the holding material 10 and the casing 30 so that the organic polymer 40 is brought into contact with the outer surface 11 of the holding material 10 and the inner surface 31 of the casing 30 during the treatment of the gas.

The placement of the organic polymer 40 in the gas treatment device 1 is not particularly limited, as long as the organic polymer 40 is brought into contact with the outer surface 11 of the holding material 10 and the inner surface 31 of the casing 30 during the treatment of the gas with the gas treatment device 1.

That is, for example, before the holding material 10 and the treatment structure 20 are inserted into the casing 30, the organic polymer 40 may be placed on the outer surface 11 of the holding material 10 and/or the inner surface 31 of the casing 30, and then the holding material 10 and the treatment structure 20 may be inserted into the casing 30.

In addition, the holding material 10 according to this embodiment of the present invention is used in such gas treatment device 1. That is, the holding material 10 is the holding material 10 made of the inorganic fibers for a gas treatment device to foe placed between the treatment structure 20 and casing 30 in the gas treatment device 1 including the treatment structure 20 and the casing 30, in which the organic polymer 40, which has a softening temperature equal to or lower than the temperature of the casing 30 during the treatment of a gas with the gas treatment device 1 and a decomposition temperature higher than the temperature of the casing 30 during the treatment of the gas, is placed on its outer surface 11 so that the organic polymer 40 is brought into contact with the inner surface of the casing 30 during the treatment of the gas.

The placement of the organic polymer 40 in the holding material 10 is not particularly limited as long as the organic polymer 40 is brought into contact with the outer surface 11 of the holding material 10 and the inner surface 31 of the casing 30 during the treatment of the gas with the gas treatment device 1. That is, for example, the organic polymer 40 may be placed on the entirety of the outer surface 11 of the holding material 10, or may be placed on a part of the outer surface 11.

Specifically, for example, the organic polymer 40 may be placed, so that the area of a range in the outer surface 11 of the holding material 10 where the organic polymer 40 is placed is 2.5% or more (2.5% or more and 100% or less) of the entire area of the outer surface 11, or may be placed so that the area is 5% or more thereof.

In addition, in a case where the organic polymer 40 is placed on a part of the outer surface 11 of the holding material 10, the organic polymer 40 may be placed so that the area of the range in the outer surface 11 of the holding material 10 where the organic polymer 40 is placed is 2.5% or more and 50% or less of the entire area of the outer surface 11, or may be placed so that the area is 2.5% or more and 20% or less thereof.

In addition, in a case where the organic polymer 40 is placed on a part of the outer surface 11 of the holding material 10, the organic polymer 40 may be placed in, for example, an island manner. That is, the organic polymer 40 is placed so that a plurality of insular portions in each of which the organic polymer 40 is placed and an outer peripheral portion in which the organic polymer 40 is not placed, the outer peripheral portion surrounding the respective plurality of insular portions, are formed in the outer surface 11 of the holding material 10. It should be noted that the shapes of the insular portions are not particularly limited.

In this case as well, the organic polymer 40 may be placed in an island manner so that the area of the range in the outer surface 11 of the holding material 10 where the organic polymer 40 is placed is 2.5% or more and 50% or less of the entire area of the outer surface 11, or may be placed in an island manner so that the area is 2.5% or more and 20% or less thereof.

In addition, on the outer surface 11 of the holding material 10, the organic polymer 40 may be placed in a layer manner. That is, in this case, on the outer surface 11 of the holding material 10, a layer of the organic polymer 40 covering the entirety or part of the outer surface 11 is formed. In a case where the organic polymer 40 covers part of the outer surface 11 of the holding material 10, the layer of the organic polymer 40 may be formed in an island manner as described above.

In addition, in the gas treatment device 1, the organic polymer 40 is localized in a boundary portion between the outer surface 11 of the holding material 10 and the inner surface 31 of the casing 30. That is, the amount (e.g., weight per unit volume) of the organic polymer 40 in the boundary portion between the outer surface 11 of the holding material 10 and the inner surface 31 of the casing 30 is larger than the amount of the organic polymer 40 in the holding material 10 (e.g., in the central portion of the holding material 10 in the radial direction of the gas treatment device 1 (thickness direction of the holding material 10)). Accordingly, in the gas treatment device 1, the organic polymer 40 placed, so as to be brought into contact with the outer surface 11 of the holding material 10 and the inner surface 31 of the casing 30 during the treatment of the gas is easily distinguished from, for example, the organic binder present inside the holding material 10.

More specifically, for example, the weight of the organic polymer 40 per unit volume in the boundary portion between the outer surface 11 of the holding material 10 and the inner surface 31 of the casing 30 is 1.5 times or more as large as the weight of the organic polymer 40 per unit volume in the central portion of the holding material 10 in the radial direction of the gas treatment device 1.

Similarly, in the holding material 10 having the organic polymer 40 placed on its outer surface 11, the organic polymer 40 is localized on the outer surface 11. That is, the amount (e.g., weight per unit volume) of the organic polymer 40 on the outer surface 11 of the holding material 10 is larger than the amount of the organic polymer 40 inside the holding material 10 (e.g., in the central portion in the thickness direction of the holding material 10). Accordingly, the organic polymer 40 placed on the outer surface 11 of the holding material 10 is easily distinguished from, for example, the organic binder present inside the holding material 10.

More specifically, for example, the weight of the organic polymer 40 per unit volume on the outer surface 11 of the holding material 10 is 1.5 times or more as large as the weight of the organic polymer 40 per unit volume in the central portion in the thickness direction of the holding material 10. In addition, for example, the holding material 10 may be free of the organic polymer 40 in the central portion in its thickness direction.

A method of placing the organic polymer 40 on the outer surface 11 of the holding material 10 and/or the inner surface 31 of the casing 30 is not particularly limited, and for example, the organic polymer 40 may be applied to the outer surface 11 and/or the inner surface 31 by: applying an application liquid obtained by dissolving the organic polymer 40 in a solvent to the outer surface 11 and/or the inner surface 31; and then evaporating the solvent. Alternatively, for example, the following procedure may be employed: the molten organic polymer 40 is applied to the outer surface 11 and/or the inner surface 31 of the casing 30, and is then cooled and solidified. Alternatively, for example, one or more selected from the group consisting of particles (such as powder and/or pellets), fibers, and sheets of the organic polymer 40 may be bonded to the outer surface 11 of the holding material 10 and/or the inner surface 31 of the casing 30 by appropriate means such as thermal welding.

Alternatively, for example, a fibrous body (e.g., woven fabric or nonwoven fabric) of the organic polymer 40 may be laminated on the outer surface 11 of the holding material 10 and/or the inner surface 31 of the casing 30. In this case, the fibrous body of the organic polymer 40 may be bonded to the outer surface 11 of the holding material 10 and/or the inner surface 31 of the casing 30 by thermal welding and/or with an adhesive. The organic polymer 40 identical in kind to, or different in kind from, the organic polymer 40 constituting the fibrous body may be used as the adhesive.

Specifically, in a case where the holding material 10 has the base member 10a made of inorganic fibers and the fiber sheet 10b laminated on the side of the base member 10a closer to the casing 30 as illustrated in FIG. 7, the fiber sheet 10b may be constituted of, for example, fibers of the organic polymer 40 having a softening temperature equal to or lower than the temperature of the casing 30 during the treatment of a gas with the gas treatment device 1 and a decomposition temperature higher than the temperature of the casing 30 during the treatment of the gas. That is, in this case, the organic polymer 40 is placed as the fiber sheet 10b.

Alternatively, for example, the organic polymer 40 may be placed at at least one selected from a boundary portion between the fiber sheet 10b and the base member 10a, the inside of the fiber sheet 10b, and the surface of the fiber sheet 10b on the side closer to the casing 30.

In such a case, the organic polymer 40 may be utilized as an adhesive for bonding the fiber sheet 10b and the base member 10a. In addition, in such a case, the fibers constituting the fiber sheet 10b are not particularly limited.

The gas treatment device 1 may be produced by, for example, a method including placing the organic polymer 40, which has a softening temperature equal to or lower than the temperature of the casing 30 during the treatment of a gas with the gas treatment device 1 and a decomposition temperature higher than the temperature of the casing 30 during the treatment of the gas, between the holding material 10 and the casing 30 so that the organic polymer 40 is brought into contact with the outer surface 11 of the holding material 10 and the inner surface 31 of the casing 30 during the treatment of the gas.

In addition, the holding material 10 may be produced by, for example, a method, including placing the organic polymer 40, which has a softening temperature equal to or lower than the temperature of the casing 30 during the treatment of a gas with the gas treatment device 1 and a decomposition temperature higher than the temperature of the casing 30 during the treatment of the gas, on its outer surface 11 so that the organic polymer 40 is brought into contact with the inner surface of the casing 30 during the treatment of the gas.

In the production of the gas treatment device 1 and/or the holding material 10, the temperature of the casing 30 during the treatment of the gas is determined so that a relationship among the temperature of the casing 30, the softening temperature of the organic polymer 40, and the decomposition temperature of the organic polymer 40 have such a proper relationship as described above.

That is, a method of producing the gas treatment device 1 may include, for example, determining the temperature of the casing 30 during the treatment of the gas, selecting the organic polymer 40 having a softening temperature equal to or lower than the determined temperature of the casing 30 and a decomposition temperature higher than the determined temperature of the casing 30, and placing the selected organic polymer 40 between the holding material 10 and the casing 30 so that the organic polymer 40 is brought into contact with the outer surface 11 of the holding material 10 and the inner surface 31 of the casing 30 during the treatment of the gas.

In addition, a method of producing the holding material 10 may include, for example, determining the temperature of the casing 30 during the treatment of the gas, selecting the organic polymer 40 having a softening temperature equal to or lower than the determined temperature of the casing 30 and a decomposition temperature higher than the determined temperature of the casing, and placing the selected organic polymer 40 on the outer surface 11 of the holding material 10 so that the organic polymer 40 is brought into contact with the inner surface 31 of the casing 30 during the treatment of the gas.

The temperature of the casing 30 during the treatment of the gas is determined theoretically and/or experimentally on the basis of conditions such as the temperature of the gas, the heat-insulating properties (thermal conductivity, thickness, and temperature of the outer surface 21) of the treatment structure 20, and the heat-insulating properties (thermal conductivity, thickness, and temperature of the outer surface 11) of the holding material 10.

It should be noted that the temperature of the casing 30 to be determined may be a range having a predetermined width. In this case, for example, the organic polymer 40 having a softening temperature equal to or lower than a lower limit for the temperature range of the casing 30 and a decomposition temperature higher than an upper limit for the temperature range of the casing may be selected.

Next, specific examples according to the embodiments of the present invention are described.

EXAMPLE 1

Production of Holding Material

A holding material produced by a wet method was provided. That is, an aqueous slurry containing alumina fibers (alumina: 96 mass %, silica: 4 mass %) as a main component, and having an organic binder (acrylic resin) and inorganic binders (such as an alumina sol and a silica sol) added thereto was prepared, and the aqueous slurry was subjected to dewatering molding to produce a holding material as an inorganic fibrous body. The holding material was of a mat shape (measuring 375 mm by 90 mm, thickness: 9.3 mm) having a basis weight of 1,400 g/m$^2$ and a bulk density of 0.15 g/cm$^3$.

Then, polyethylene (PE) (softening temperature: 90° C., decomposition temperature: 400° C.) was placed as an organic polymer in a range of from an end portion on a surface on one side of the holding material (an end portion on one side in the direction in which a gas flowed in a gas treatment device) to 70 mm. That is, a sheet of the polyethylene was molded and the sheet was attached to a part of the surface of the holding material by thermal welding to place the organic polymer on the part of the surface of the holding material. It should be noted that a holding material in which the organic polymer was not placed was also provided as an object of comparison.

Production of Gas Treatment Device

A gas treatment device, which includes a treatment structure made of ceramics of a cylindrical shape having an outer diameter of 110 mm, the holding material provided as described above, and a casing made of stainless steel of a cylindrical shape having an inner diameter of 118 mm, was produced.

That is, first, an assembly was produced by winding the holding material around the outer peripheral surface of the treatment structure so that the surface having placed thereon the organic polymer was placed on an outside in the radial direction of the treatment structure. Next, the gas treatment device was produced by pressing (canning) the assembly into the casing so that the surface of the holding material on which the organic polymer is placed was brought into contact with the inner surface of the casing.

Evaluation for Extrusion Force after Canning

Figure 8:
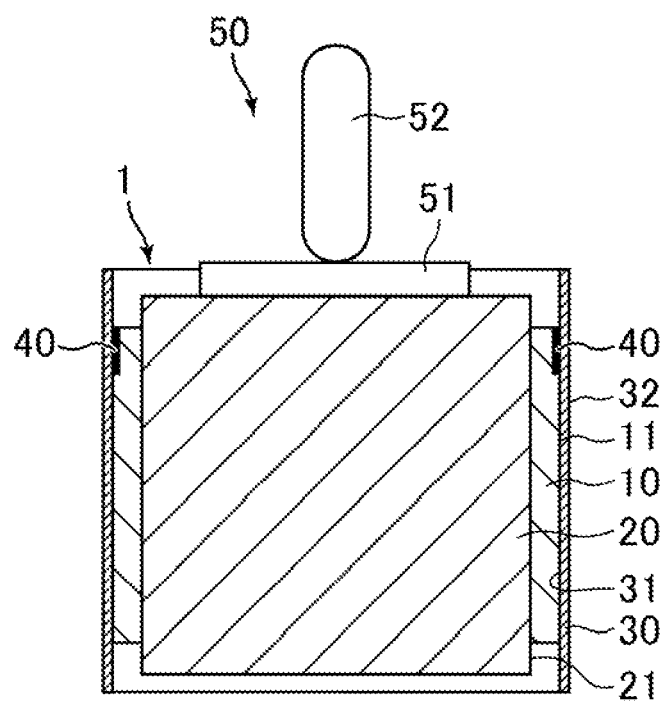
FIG. 8 is an explanatory diagram illustrating the outline of a testing device used in examples according to an embodiment of the present invention.

An extrusion force after the canning was evaluated with such a testing device 50 as illustrated in FIG. 8. The testing device 50 included: an extruding jig 51 as a disc made of stainless steel mounted on an end surface on one side in the longitudinal direction of the treatment structure 20 (direction in which the gas flowed); and a rod-shaped push rod 52 for pushing the treatment structure 20 toward the other side in the longitudinal direction (a lower side in FIG. 8) through the extruding jig 51. In the testing device 50, the organic polymer 40 was placed on a part of the outer surface 11 of the holding material 10, which had been brought into contact with the inner surface 31 of the casing 30 as illustrated in FIG. 8. In addition, a temperature sensor (not shown) was attached to each of the outer surface 21 of the treatment structure 20 and the outer surface 32 of the casing 30.

Then, the maximum load needed for extruding the treatment structure 20 and the holding material 10 from the casing 30 in the gas treatment device 1 was measured as an extrusion load (N) with the testing device 50. The measurement was performed under 8 kinds of conditions shown in FIG. 9.

Result

FIG. 9 shows the results of the measurement. In FIG. 9, a numerical value in the row "gap" represents an interval (mm) between the holding material and the casing (distance between the outer surface of the holding material and the inner surface of the casing), and a numerical value in the row "casing temperature" represents the temperature (° C.) of the casing in the case where the temperature of the treatment structure is a temperature (° C.) in the row "treatment structure temperature." In addition, the description, "present" in the row "cooling operation" means that a cooling operation based or forced convection for flowing air around the outer surface of the casing was performed with an air-blowing device, and the description "absent" in the row means that the cooling operation was not performed. It should be noted that a condition that the cooling operation was not performed was used as a condition corresponding to a conventional and general use condition of a catalyst converter provided for treating an exhaust gas in an engine.

As shown in FIG. 3, when the temperature of the treatment structure was 800° C., the extrusion load of Example 1-1 in which the holding material in which the organic polymer (PE) was placed was used, and the temperature of the casing was regulated to fall within a range of from more than the softening temperature of the organic polymer to less than its decomposition temperature by cooling the casing was significantly high as compared with that of Comparative Example 1-1 in which the holding material in which the organic polymer was not placed was used.

In contrast, when the temperature of the treatment structure was similarly 800° C., the extrusion load of Comparative Example 1-2 in which the holding material in which the organic polymer (PE) was placed was used, and the temperature of the casing was higher than the decomposition temperature of the organic polymer without the cooling of the casing was comparable to that of Comparative Example 1-3 in which the holding material in which the organic polymer was not placed was used, and was significantly low as compared with that of Example 1-1 described above.

That is, it was confirmed that even when the organic polymer was used, in the case where the temperature of the casing was equal to or higher than the decomposition temperature of the organic polymer, an effect of the use of the organic polymer was not obtained. As shown in FIG. 9, similar results to those in the case where the temperature of the treatment structure was 800° C. were obtained for the case where the temperature of the treatment structure was 900° C. (Example 1-2 and Comparative Examples 1-4 to 1-6).

EXAMPLE 2

Production of Holding Material and Gas Treatment Device

A holding material having the organic polymer placed on its outer surface and a gas treatment device including the holding material were produced in the same manner as in Example 1 described above except that Polyvinyl chloride (PVC) (softening temperature: 70° C., decomposition temperature: 250° C.), polyethylene terephthalate (PET) (softening temperature: 250° C., decomposition temperature: 300° C.), polyvinyl acetate (PVAc) (softening temperature: 60° C., decomposition temperature: 300° C.), polypropylene (PP) (softening temperature: 170° C., decomposition temperature: 400° C.), or polyimide (PI) (softening temperature: 210° C., decomposition temperature: 500° C.) was used as the organic polymer instead of the polyethylene.

Result of Evaluation for Extrusion Force after Canning

Then, as shown in FIG. 10, an extrusion load (N) was measured, under 12 kinds of conditions in the same manner as in Example 1 described above. As shown in FIG. 10, in the case where any one of the 5 kinds of organic polymers was used (Examples 2-1 to 2-6), the extrusion load, was larger than those in the cases where the organic polymers were not used (Comparative Examples 2-1 to 2-6) because the temperatures of the casings were equal to or higher than the softening temperatures of the organic polymers and lower than their decomposition temperatures.

In particular, the extrusion loads in Example 2-1, Example 2-3, Example 2-4, Example 2-5, and Example 2-6 in which organic polymers having decomposition temperatures sufficiently higher than the temperatures of the casings were used were significantly large as compared with those of Comparative Examples in which the organic polymers were not used.

EXAMPLE 3

Production of Holding Material

As shown in FIG. 11, 5 kinds of holding materials were prepared. That is, in Example 3-1, a holding material produced by a wet method in the same manner as in Example 1 described above and having the organic polymer (PE) placed on its outer surface was used as a base member, and a nonwoven fabric made of PET fibers (softening temperature: 250° C., decomposition temperature: 300° C.) was further laminated on the outer surface to produce such a holding material formed of the base member and the fiber sheet as illustrated in FIG. 7. It should be noted that in the outer surface of the holding material, the organic polymer and the nonwoven fabric were bonded to each other by thermal welding.

In Example 3-2, a holding material having the organic polymer and a fiber sheet placed on its outer surface was produced in the same manner as in Example 3-1 described above except that an inorganic fibrous body (blanket) produced by a dry method involving subjecting a collected alumina fiber (alumina: 96 mass %, silica: 4 mass %) to needle processing was used instead of the base member produced by the wet method.

In Example 3-3, a holding material was produced by laminating a fiber sheet on the outer surface of a base member produced by the dry method without placing any organic polymer. The fixation of the fiber sheet in the outer surface of the base member was performed by subjecting the fiber sheet, which was in a state of being laminated on the outer surface of the base member, to needling to entangle fibers constituting the fiber sheet and fibers constituting the base member.

In Example 3-4, a holding material in which an organic polymer was placed on its outer surface and no fiber sheet was laminated was produced in the same manner as in Example 1 described above except that a holding material produced by the dry method was used instead of the holding material produced by the wet method.

In Comparative Example 3, none of the organic polymer and the fiber sheet was used, and the blanket produced by the dry method was used as it was as a holding material.

Production of Gas Treatment Device

A gas treatment device was produced by using the 5 kinds of holding materials prepared as described above in the same manner as in Example 1 described above.

Result of Evaluation for Extrusion Force after Canning

Then, as shown in FIG. 11, an extrusion load (N) was measured under 5 kinds of conditions in the same manner as in Example 1 described above. As shown in FIG. 11, the extrusion loads of Examples 3-1 to 3-4 in each of which the organic polymer and/or the fiber sheet made of organic fibers was used were higher than that of Comparative Example 3 in which none of the organic polymer and the fiber sheet was used. In particular, the extrusion loads of Example 3-1, Example 3-2, and Example 3-4 in each of which the holding material having the organic polymer (PE) placed on its outer surface was used were significantly high as compared with that of Comparative Example 3. It should be noted that in each of Example 3-1 and Example 3-2, the organic polymer (PE) placed on the outer surface of the base member was softened by heating, and the softened polymer passed from the outer surface through a gap between the fibers constituting the fiber sheet to be exposed to a casing side, thereby bonding to the inner surface of the casing.

The invention claimed is:

1. A method of treating a gas with a gas treatment device comprising a treatment structure, a casing made of a metal for housing the treatment structure and a holding material made of inorganic fibers placed between the treatment structure and the casing, the method comprising:
   placing an organic polymer between the holding material and the casing so that the organic polymer is brought into contact with an outer surface of the holding material and an inner surface of the casing during treatment of the gas; and
   treating the gas under a condition that a temperature of the casing is equal to or higher than a softening temperature of the organic polymer and lower than a decomposition temperature of the organic polymer.

2. The gas treatment method according to claim 1, wherein the temperature of the casing during the treatment of the gas is 60° C. or more and 500° C. or less.

3. The gas treatment method according to claim 1, wherein the treatment of the gas is performed under a condition that the temperature of the casing is regulated to be equal to or higher than the softening temperature of the organic polymer and lower than the decomposition temperature of the organic polymer by cooling the casing.

4. A holding material made of inorganic fibers for a gas treatment device to be placed between a treatment structure and a casing in the gas treatment device comprising the treatment structure and the casing made of a metal for housing the treatment structure,
   wherein an organic polymer, which has a softening temperature equal to or lower than a temperature of the casing during treatment of a gas with the gas treatment device and a decomposition temperature higher than the temperature of the casing during the treatment of the gas, is placed on an outer surface of the holding material so that the organic polymer is brought into contact with an inner surface of the casing during the treatment of the gas.

5. A gas treatment device, comprising:
   a treatment structure;
   a casing made of a metal for housing the treatment structure; and
   a holding material made of inorganic fibers placed between the treatment structure and the casing,
   wherein an organic polymer, which has a softening temperature equal to or lower than a temperature of the casing during treatment of a gas with the gas treatment device and a decomposition temperature higher than the temperature of the casing during the treatment of the gas, is placed between the holding material and the casing so that the organic polymer is brought into contact with an outer surface of the holding material and an inner surface of the casing during the treatment of the gas.

6. A method of producing a holding material made of inorganic fibers for a gas treatment device to be placed between a treatment structure and a casing in the gas treatment device comprising the treatment structure and the casing made of a metal for housing the treatment structure, the method comprising:
   placing an organic polymer, which has a softening temperature equal to or lower than a temperature of the casing during treatment of a gas with the gas treatment device and a decomposition temperature higher than the temperature of the casing during the treatment of the gas, on an outer surface of the holding material so that the organic polymer is brought into contact with an inner surface of the casing during the treatment of the gas.

7. The method of producing a holding material for a gas treatment device according to claim 6, further comprising:
   determining the temperature of the casing during the treatment of the gas;
   selecting the organic polymer having a softening temperature equal to or lower than the determined temperature of the casing and a decomposition temperature higher than the determined temperature of the casing; and
   placing the selected organic polymer on the outer surface of the holding material so that the organic polymer is brought into contact with the inner surface of the casing during the treatment of the gas.

8. A method of producing a gas treatment device comprising a treatment structure, a casing made of a metal for housing the treatment structure and a holding material made of inorganic fibers placed between the treatment structure and the casing, the method comprising:
   placing an organic polymer, which has a softening temperature equal to or lower than a temperature of the casing during treatment of a gas with the gas treatment device and a decomposition temperature higher than the temperature of the casing during the treatment of the gas, between the holding material and the casing so that the organic polymer is brought into contact with an outer surface of the holding material and an inner surface of the casing during the treatment of the gas.

9. The method of producing a gas treatment device according to claim 8, further comprising:
   determining the temperature of the casing during the treatment of the gas;
   selecting the organic polymer having a softening temperature equal to or lower than the determined temperature of the casing and a decomposition temperature higher than the determined temperature of the casing; and placing the selected organic polymer between the holding material and the casing so that the organic polymer is brought into contact with the outer surface of the holding material and the inner surface of the casing during the treatment of the gas.

10. The gas treatment method according to claim 2, wherein the treatment of the gas is performed under a condition that the temperature of the casing is regulated to be equal to or higher than the softening temperature of the organic polymer and lower than the decomposition temperature of the organic polymer by cooling the casing.

\* \* \* \* \*